(12) United States Patent
Cheng

(10) Patent No.: US 9,974,144 B2
(45) Date of Patent: May 15, 2018

(54) METHOD FOR DETECTING ENVIRONMENTAL ILLUMINATION AND A FIXTURE BUILT-IN MOTION SENSOR THEREOF

(71) Applicant: HYTRONIK ELECTRONICS CO., LTD, Huizhou, Guangdong (CN)

(72) Inventor: Yabing Cheng, Guangdong (CN)

(73) Assignee: HYTRONIK ELECTRONICS CO., LTD, Huizhou (CN)

( * ) Notice: Subject to any disclaimer, the term of this patent is extended or adjusted under 35 U.S.C. 154(b) by 0 days. days.

(21) Appl. No.: 15/712,200

(22) Filed: Sep. 22, 2017

(65) Prior Publication Data

US 2018/0103527 A1 Apr. 12, 2018

(30) Foreign Application Priority Data

Oct. 9, 2016 (CN) .......................... 2016 1 0883656

(51) Int. Cl.
*H05B 37/02* (2006.01)
*H05B 33/08* (2006.01)
*F21V 23/04* (2006.01)

(52) U.S. Cl.
CPC ..... *H05B 37/0218* (2013.01); *F21V 23/0464* (2013.01); *F21V 23/0471* (2013.01); *H05B 33/08* (2013.01); *H05B 33/0824* (2013.01); *H05B 33/0845* (2013.01); *H05B 33/0848* (2013.01); *H05B 33/0854* (2013.01); *H05B 37/02* (2013.01); *H05B 37/0209* (2013.01)

(58) Field of Classification Search
CPC ............ H05B 37/0218; H05B 37/0227; H05B 33/0842; H05B 33/0848; H05B 37/02; H05B 41/36; F21V 23/0442; F21V 23/0464; F21V 23/0471; F21Y 2115/10; H04N 5/2354; Y02B 20/46; G01S 13/56; G02B 5/208
See application file for complete search history.

(56) References Cited

U.S. PATENT DOCUMENTS

| | | | | |
|---|---|---|---|---|
| 8,172,423 B2* | 5/2012 | Sobagaki | ............ | F21V 23/0442 250/205 |
| 8,781,171 B2* | 7/2014 | King | ........................ | B60R 1/00 382/100 |
| 8,872,672 B2* | 10/2014 | Whang | .................. | G08G 1/095 116/63 R |

(Continued)

*Primary Examiner* — Vibol Tan

(57) ABSTRACT

A method for detecting environmental illumination and a fixture built-in motion sensor thereof, comprising: obtaining the environmental lux level on visible light band through a visible light detection module and the environmental lux level on invisible light band through an invisible light detection module; the lamp is turned on when said environmental lux level of visible light is lower than the preset lux level; obtaining the mixed lux level of the lamplight and the natural light on visible light band and obtaining the mixed lux level of the lamplight and the natural light on invisible light band; calculating the turn-off threshold value for turning off the lamp through the environmental lux level and the mixed lux level. The illumination of natural spectrum is detected accurately without being interfered by the illumination of the artificial spectrum emitted by the lamp itself, thus the lamp can be controlled accurately and stably.

10 Claims, 7 Drawing Sheets

(56) References Cited

U.S. PATENT DOCUMENTS

| | | | | |
|---|---|---|---|---|
| 9,469,251 B2* | 10/2016 | Vaghefinazari | ........... | B60R 1/00 |
| 9,538,611 B2* | 1/2017 | Cheng | ................ | H05B 37/0218 |
| 9,775,222 B1* | 9/2017 | Chen | ................. | H05B 37/0272 |
| 9,778,102 B2* | 10/2017 | Pang | ..................... | G01J 1/4204 |
| 9,852,332 B2* | 12/2017 | Vaghefinazari | .... | G06K 9/00335 |
| 2009/0268461 A1* | 10/2009 | Deak | ................... | C09K 11/778 |
| | | | | 362/247 |

* cited by examiner

METHOD FOR DETECTING ENVIRONMENTAL ILLUMINATION AND A FIXTURE BUILT-IN MOTION SENSOR THEREOF

CROSS REFERENCE TO RELATED APPLICATIONS

The present application claims the benefit of Chinese Patent Application No. 201610883656.1 filed on Oct. 9, 2016, the contents of which are hereby incorporated by reference.

TECHNICAL FIELD

The Invention relates to the field of lighting control technology, especially to a method for detecting environmental illumination and a fixture built-in motion sensor thereof.

BACKGROUND ART

With the popularity of intelligent lamps, a more efficient and humanized product is expected by more and more customers hoping that the lamp can be turned off automatically when external light exceeds a certain lux level and turned on automatically when external light is lower than the preset lux level; or it can adjust the lighting intensity automatically according to the environmental illumination to realize the interaction between artificial light and natural light and thus achieve the effect of intelligent lighting control. Therefore, the manufacturers of lamps are expecting that a sensor for light sensation detection may be built in a lamp so as to add the function of intelligent control, maintain the appearance of the lamp, and also reduce the cost of wiring and installation difficulty for end-users.

However, the built-in photoelectric sensor may receive both the external natural spectrum and the artificial spectrum emitted by the lamp. Moreover, the visible light intensity of the artificial spectrum emitted or reflected through the translucent cover of the lamp is far greater than that of the surrounding natural spectrum. Meanwhile, the lux level of the invisible light in the artificial spectrum will change with the color temperature; the lower the color temperature of the lighting source is, the higher the lux level of the invisible light will be. Such built-in sensor cannot detect the intensity of surrounding natural light accurately through ordinary light detecting method, thus the function of brightness control and turn-off control of the lamp cannot be realized according to actual intensity of natural light. Most built-in sensors on the market at present cannot detect the lux level of the lamp itself. In case the threshold value of environmental natural light for turning on the lamp is lower than the preset lux level, such as at dawn, the lamp will be activated and keep on lighting if people pass by frequently. As the actual lux level of the natural light cannot be detected while the lamp is lighted, the lamp will not be turned off even if the external natural light is bright, thus the energy is wasted. For this problem and the actual demand, the lamp and the sensor are normally arranged separately. For example, the light sensor is kept far away from the lamp by leading out through a leading wire so that it can collect the natural light only. As for such scheme, the size and installation structure of the lamp will be redesigned and re-customized and the overall appearance of the lamp will be affected, resulting in high costs, therefore, it is to promote the lamp on a large scale.

SUMMARY OF THE INVENTION

The technical problem to be solved by the Invention is to provide a method for detecting environmental illumination and a built-in sensor thereof in lamps, so that the illumination of the natural spectrum can be detected accurately without being interfered by that of artificial spectrum and the lamp can be controlled accurately and stably with the sensor integrated into the lamp.

In order to solve the above technical problem, the Invention provides the technical scheme as follows:

A method for detecting environmental illumination in lamps, comprising the following steps of:

S1: Obtaining the environmental lux level on visible light band through a visible light detection module and the environmental lux level on invisible light band through an invisible light detection module when the lamp is turned off;

S2: Turning on the light as said environmental lux level of visible light is lower than the preset lux level, obtaining the mixed lux level of the lamplight and the natural light on visible light band through the visible light detection module and the mixed lux level of the lamplight and the natural light on invisible light band through the invisible light detection module;

S3: Calculating the environmental lux level of invisible light of the lamplight according to the environmental lux level and the mixed lux level on invisible light band so as to further calculate the turn-off threshold value for turning off the lamp; when the mixed lux level of invisible light obtained by the invisible light detection module is greater than said turn-off threshold value, the lamp is turned off.

Further, in said Step S3, the formula of said turn-off threshold value is as follows:

$$\text{LuxOff} = (\text{LuxS} + \text{LuxO} + \text{LuxL}) * k;$$

wherein, LuxOff is a turn-off threshold value of the lamp; LuxS is a preset lux level; LuxO is a fixed illumination compensation value; LuxL is an lux level of invisible light; k is an adjustment coefficient, which is greater than 1.

Further, said visible light detection module is used for detecting the lux level on the visible light band of 400 nm-700 nm; said invisible light detection module is used for detecting the lux level on the invisible light band of 700 nm-1050 nm.

Further, in said Step S2, the inductive signals of human movements are obtained in real time; meanwhile, the lamp is turned on when said environmental lux level of visible light is lower than the preset lux level.

Further, the lamp comprises two operating modes as delay brightness and waiting brightness; the lamp enters the operating mode of delay brightness firstly when it is turned on and enters the operating mode of waiting brightness after a delay time; the turn-off threshold value for the operating mode of delay brightness is calculated corresponding to said operating mode of delay brightness and the turn-off threshold value for the operating mode of waiting brightness is calculated corresponding to said operating mode of waiting brightness.

In order to realize the above method for detecting environmental illumination in lamps, the Invention also provides a built-in sensor for detecting environmental illumination in lamps, which comprises a visible light detection module, an invisible light detection module, a sensing detection module, a function interface setting module, an MCU program control module and a driving circuit control module; said visible light detection module, invisible light detection module, sensing detection module, function interface setting module and driving circuit control module are electrically connected to said MCU program control module; said visible light detection module is used for obtaining the lux level of visible light in real time; said invisible light detection module is used for obtaining the lux level of invisible light; said sensing detection module is used for obtaining inductive signals of human movements in real time; said function interface setting module is used for inputting and displaying parameters; said MCU program control module is used for calculating and outputting control instructions; said control instruction is sent to the driving circuit control module which is connected to LED lamp sets.

Further, the photoelectric sensor in said visible light detection module is a photosensitive element with a peak sensitive wavelength λp of 520 nm and a spectral sensitive band of 400-750 nm and the photoelectric sensor in said invisible light detection module is a photosensitive element with a peak sensitive wavelength λp of 880 nm and a spectral sensitive band of 700-1050 nm.

Further, said photosensitive element is a photodiode, a phototransistor, a silicon photocell, a photoelectric IC or a photoresistor.

Further, said sensing detection module comprises but not limited to any of microwave sensor, infrared sensor and sonic sensor.

Further, said sensor further comprises a power supply module; said power supply module is used for supplying operating load to said visible light detection module, invisible light detection module, sensing detection module, function interface setting module, MCU program control module and driving circuit control module respectively.

Further, said function interface setting module comprises but not limited to a sensitivity setting unit, a preset lux level setting unit, a delay time setting unit, a waiting time setting unit, a remote control interface setting unit and an APP interface setting unit. Said MCU program control module comprises a dual-tech sampling unit for light inductive signal, a sampling unit for mobile inductive signal, an A/D sampling signal processing unit, a calculation and analysis unit, control instruction outputting unit, a dimming instruction outputting unit; the control instruction outputting unit outputs on-off signals or FPC/RPC signals to the driving circuit control module; the driving circuit control module controls on-off or dimming of the loading lamp with the switching elements as RELAY, MOSFET, TRIAC and SCR, etc.; the dimming instruction outputting unit outputs 0/1-10V dimming signals, DALI signals, high/low level signals, PWM signals to the driving circuit control module for brightness control of the loading lamp.

With the above technical scheme, the invention combines the light sensing detection modules at two bands of the peak wavelengths of 520 nm and 880 nm, realizing the dual-tech detection method for detecting environmental illumination with the sensor built-in lamps and detecting the illumination of natural spectrum accurately without being interfered by the illumination of the artificial spectrum emitted by the lamp itself. It obtains the lux level of the lamp and the environmental lux levels before and after the lamp is lighted with this dual-tech detection method, and calculates the turn-on lux level and turn-off lux level of the built-in sensor according to the preset lux level of the sensor, thus realizing the on-off control and dimming control of the lamp and saving the energy.

Marks in the figures: 11. Power supply module; 12. Sensing Detection module; 13. Function interface setting module; 14. Visible light detection module; 15. Invisible light detection module; 16. MCU program control module; 17. Driving circuit control module.

DETAILED DESCRIPTION OF THE PREFERRED EMBODIMENTS

The invention is further described in combination with Drawings and Embodiments as follows. It shall be noted that, the description of these embodiments is for providing further understanding of the Invention, and do not form an restriction therefore. Moreover, the technical features related to the embodiments of the Invention described as follows can combine with each other when they are not conflict with each other.

PRINCIPLE OF THE INVENTION

Figure 1:
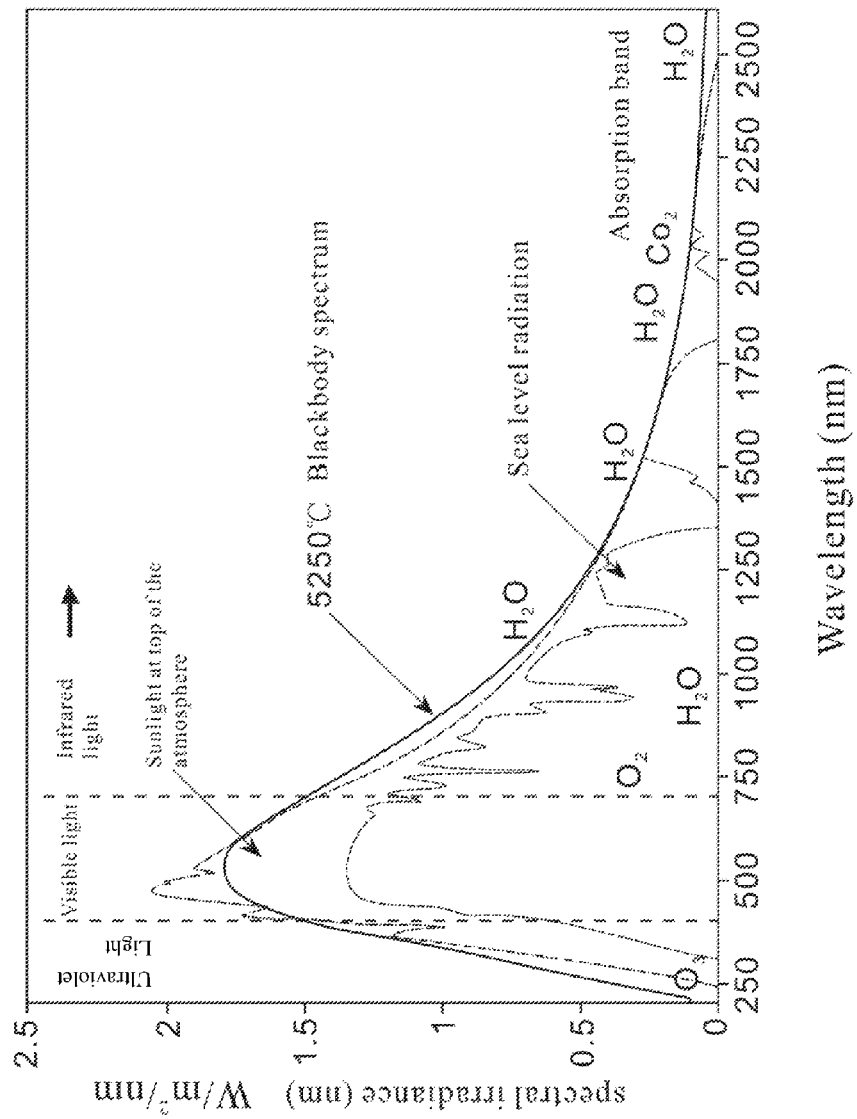
FIG. 1 is a diagram of radiation energy distribution corresponding to different wavelength spectrums of sunlight.

It can be seen from FIG. 1, the diagram of radiation energy distribution corresponding to different wavelength spectrums of sunlight that, in the natural solar spectrum, the visible light has a stronger radioactivity than the invisible light. In other words, the visible light is concentrated with the most energy in natural spectrum. With the advantage of high resolution of lower-end illumination, the existing method for light sensation detection is to detect the part of visible light concentrated with the most energy or at least the part containing visible light. Therefore, the spectral bands of the visible light concentrated with the most energy must be selected for the artificial spectrum of lamp so as to maximize the efficiency. For this reason, the artificial spectrum has a strong interference to the built-in visible light sensor while the lamp is lighted; the saturation value for light sensation detection is easy to be reached so that the changes of natural spectrum cannot be recognized and the lamps cannot be turned off accurately.

Through testing a large number of the lamps of artificial light source with different power and color temperature, it is found that the invisible infrared spectral energy of the lamps of artificial light source will be changed with the variation of the color temperature. The greater the radiating power is, the lower the color temperature is, the higher the lux level of the invisible infrared spectrum emitted by the lamp will be. As the light energy of the invisible infrared spectrum of the lamps does not reach the saturation value for light sensation detection of invisible light of the lamp, the lux level of the invisible infrared spectrum of the lamp can be deducted through sampling and algorithm of software to obtain the actual lux level of the invisible infrared spectrum in natural spectrum. Meanwhile, according the characteristic of similar trend of diurnal changes of visible and invisible light spectral energy in natural solar spectrum, the lamps can be turned off with the increase of natural spectral energy through the method of invisible light detection in the invention. Therefore, the advantage is that the artificial spectrum has a weak interference to the built-in invisible light sensor while the lamp is lighted with the method of invisible light detection. While the disadvantage is that with the low resolution of lower-end illumination, the lamps cannot be turned on accurately as the natural spectrum energy decreases.

Based on the above principle, the invention provides a method for detecting environmental illumination, comprising the following steps of:

S1: Obtaining the environmental lux level on visible light band through a visible light detection module and the environmental lux level on invisible light band through an invisible light detection module when the lamp is turned off;

S2: Turning on the light as said environmental lux level of visible light is lower than the preset lux level, obtaining the mixed lux level of the lamplight and the natural light on visible light band through the visible light detection module and the mixed lux level of the lamplight and the natural light on invisible light band through the invisible light detection module;

S3: calculating the environmental lux level of invisible light of the lamplight according to the environmental lux level and the mixed lux level on invisible light band so as to further calculate the turn-off threshold value for turning off the lamp; when the mixed lux level of invisible light obtained by the invisible light detection module is greater than said turn-off threshold value, the lamp is turned off.

Wherein, in said Step S3, the formula of said turn-off threshold value is as follows:

$$\text{LuxOff}=(\text{Lux}S+\text{Lux}O+\text{Lux}L)*k;$$

wherein, LuxOff is a turn-off threshold value of the lamp; LuxS is a preset lux level; LuxO is a fixed illumination compensation value; LuxL is an lux level of invisible light; k is an adjustment coefficient, which is greater than 1.

Wherein, said visible light detection module is used for detecting the lux level on the visible light band of 400 nm-700 nm; said invisible light detection module is used for detecting the lux level on the invisible light band of 700 nm-1050 nm.

Figure 2:
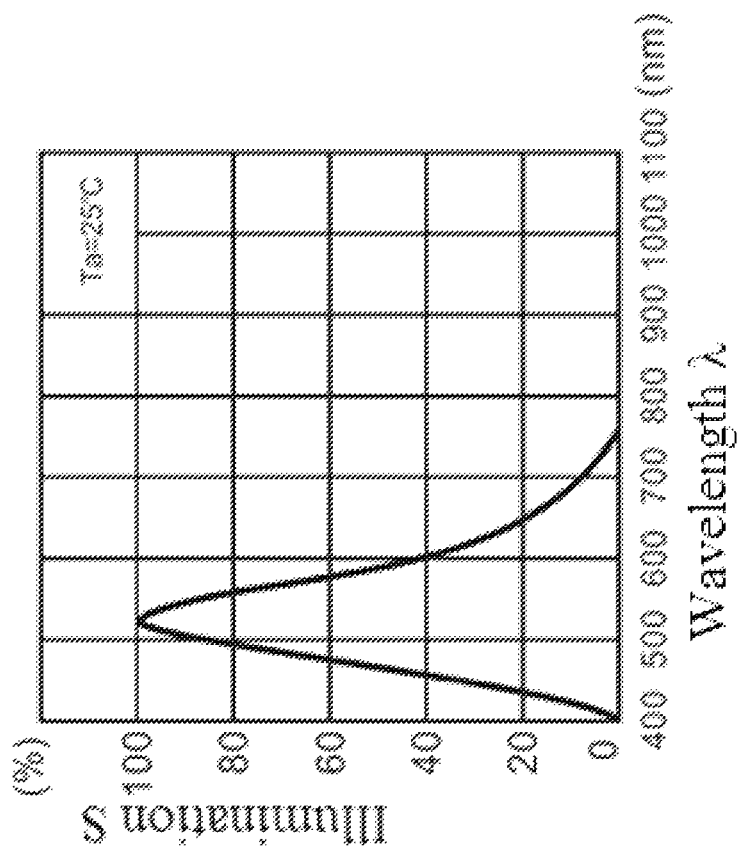
FIG. 2 is a characteristic curve of photographic transmission of the photosensitive element in PD1 visible light detection module.
Figure 3:
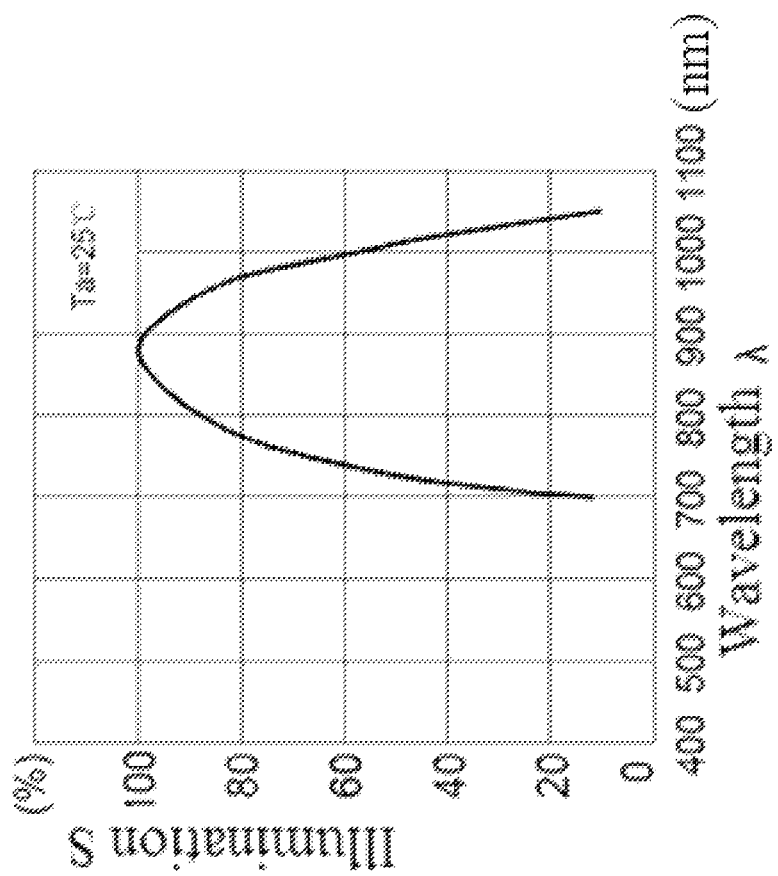
FIG. 3 is a characteristic curve of photographic transmission of the infrared photosensitive element in PD2 invisible light detection module.

Referring to FIGS. 2 and 3, wherein, FIG. 2 is the characteristic curve of photographic transmission of the photosensitive element in PD1 visible light detection module and FIG. 3 is the characteristic curve of photographic transmission of the infrared photosensitive element in PD2 invisible light detection module; In combination with the advantages and disadvantages of the above two single methods for light sensation detection, the invention creatively combines the dual technology and methods for detecting the environmental illumination of visible light and invisible light to obtain the environmental lux level on the visible light band of 400 nm-700 nm through PD1 visible light detection module and calculate the turn-on threshold value before lighting up with software algorithm, and obtain the environmental lux level on the invisible light band of 700 nm-1050 nm through PD2 invisible light detection module and calculate the turn-off threshold value after the lamp is turned on with software algorithm.

Wherein, in said Step S2, the inductive signals of human movements are obtained in real time; meanwhile, the lamp is turned on when said environmental lux level of visible light is lower than the preset lux level.

Wherein, the lamp comprises two operating modes as delay brightness and waiting brightness; the lamp enters the operating mode of delay brightness firstly when it is turned on and enters the operating mode of waiting brightness after a delay time; the turn-off threshold value for the operating mode of delay brightness is calculated corresponding to said operating mode of delay brightness and the turn-off threshold value for the operating mode of waiting brightness is calculated corresponding to said operating mode of waiting brightness.

Figure 4:
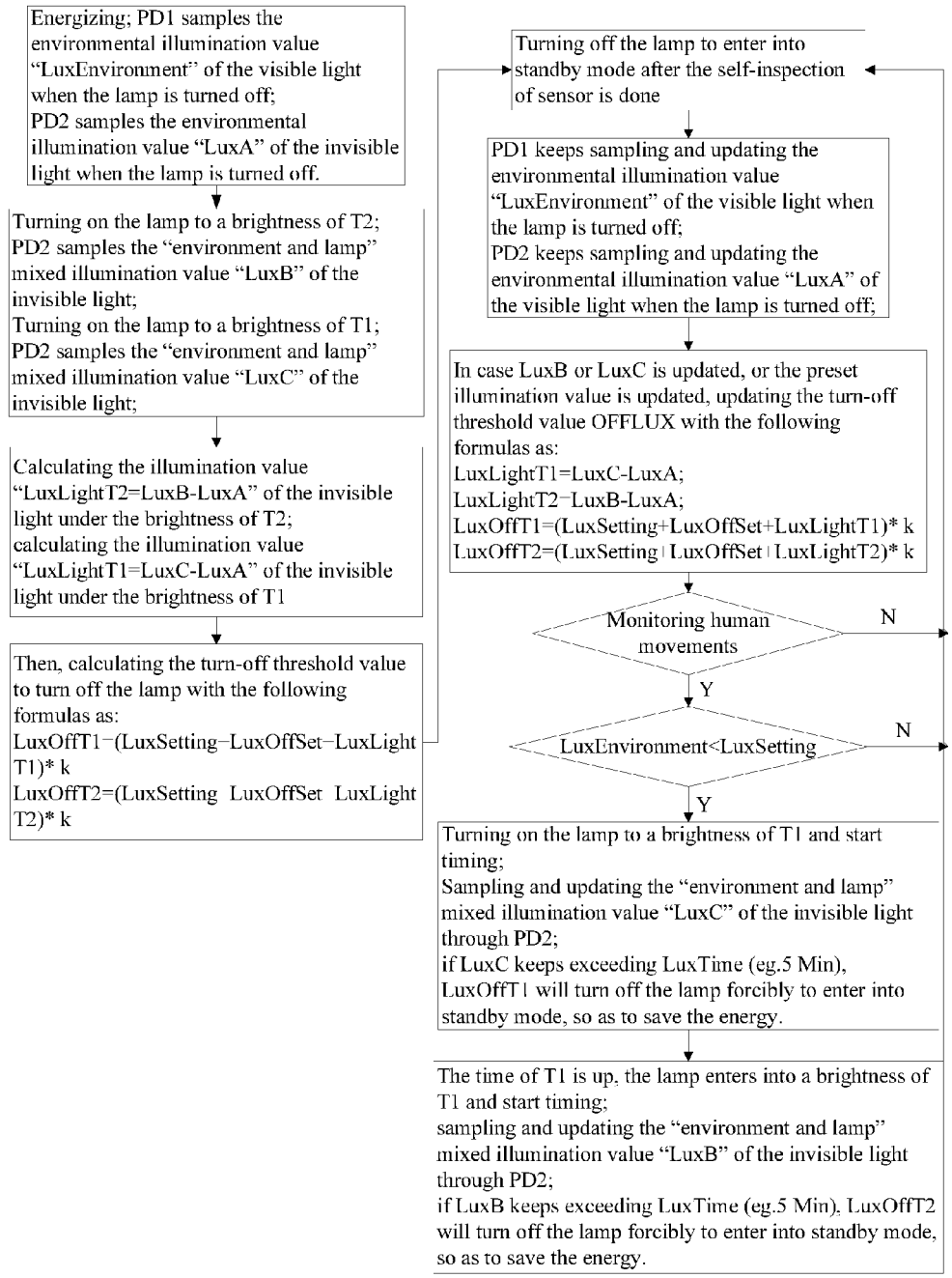
FIG. 4 is a flow diagram of the method for detecting environmental illumination in lamps of the invention.
Figure 5:
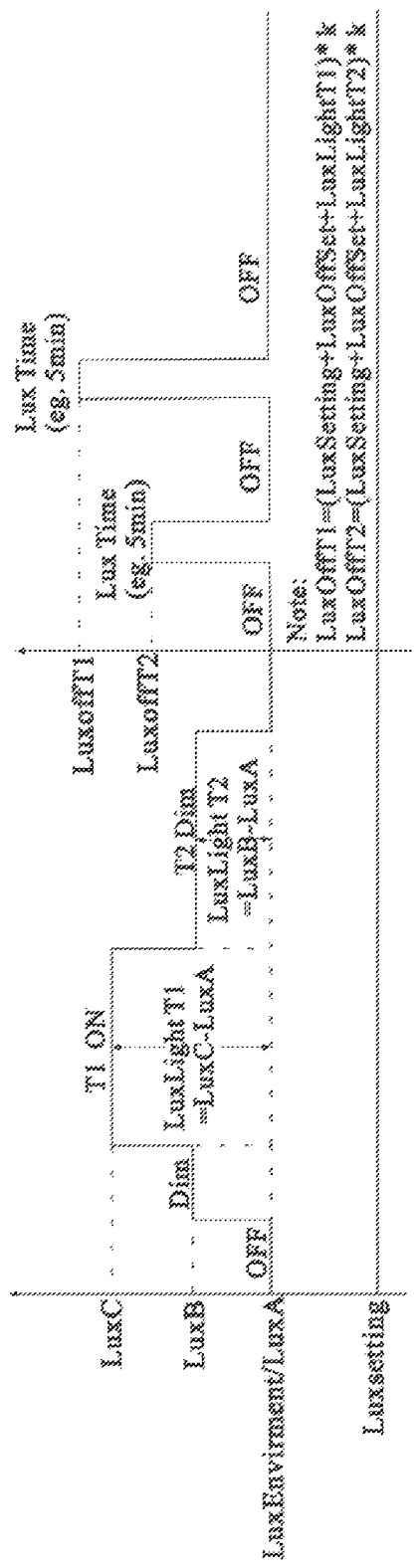
FIG. 5 is a wave diagram of the method for detecting environmental illumination in lamps of the Invention to realize three-section dimming function.

Referring to FIGS. 4 and 5, FIG. 4 is the flow diagram of the dual-tech method for detecting environmental illumination in lamps and FIG. 5 is the wave diagram of the dual-tech method for detecting environmental illumination in lamps to realize three-section dimming function; the environmental lux level "LuxEnvironment" of the visible light is obtained through PD1 visible light detection module when the lamp is off; in case the environmental lux level is less than the preset lux level "LuxSetting", "LuxEnvironment" can be serves as the turn-on threshold value before the lamp is turned on. The environmental lux level "LuxA" of the invisible light is obtained through PD2 invisible light detection module when the lamp is off; turning on the lamp to a brightness of T2; obtaining the "environment and lamp" mixed lux level "LuxB" of the invisible light through PD2 invisible light detection module and calculating the lux level "LuxLightT2=LuxB-LuxA" of the invisible light under the brightness of T2. Turning on the lamp to a brightness of T1; obtaining the "environment and lamp" mixed lux level "LuxC" of the invisible light through PD2 invisible light detection module and calculating the lux level "LuxLightT1=LuxC-LuxA" of the invisible light under the brightness of T1. Then, calculating the turn-off threshold value to turn off the lamp with the following formulas:

$$\text{LuxOff}T1=(\text{LuxSetting}+\text{LuxOffSet}+\text{LuxLight}T1)*k;$$

$$\text{LuxOff}T2=(\text{LuxSetting}+\text{LuxOffSet}+\text{LuxLight}T2)*k$$

Said LuxOffT1 is a turn-off threshold value under the brightness of T1; LuxOffT2 is a turn-off threshold value under the waiting brightness of T2 (the time scope of T2 is 0 s-+∞, which can be set freely); LuxSetting (LuxS for short) is a preset lux level; LuxOffSet (LuxO for short) is a fixed illumination compensation value; LuxLightT1 (LuxLT1 for short) is an lux level of invisible lux level under the brightness of T1; LuxLightT2 (LuxLT2 for short) is an lux level of invisible lux level under the brightness of T2; k is an adjustment coefficient, which is greater than 1.

Figure 6:
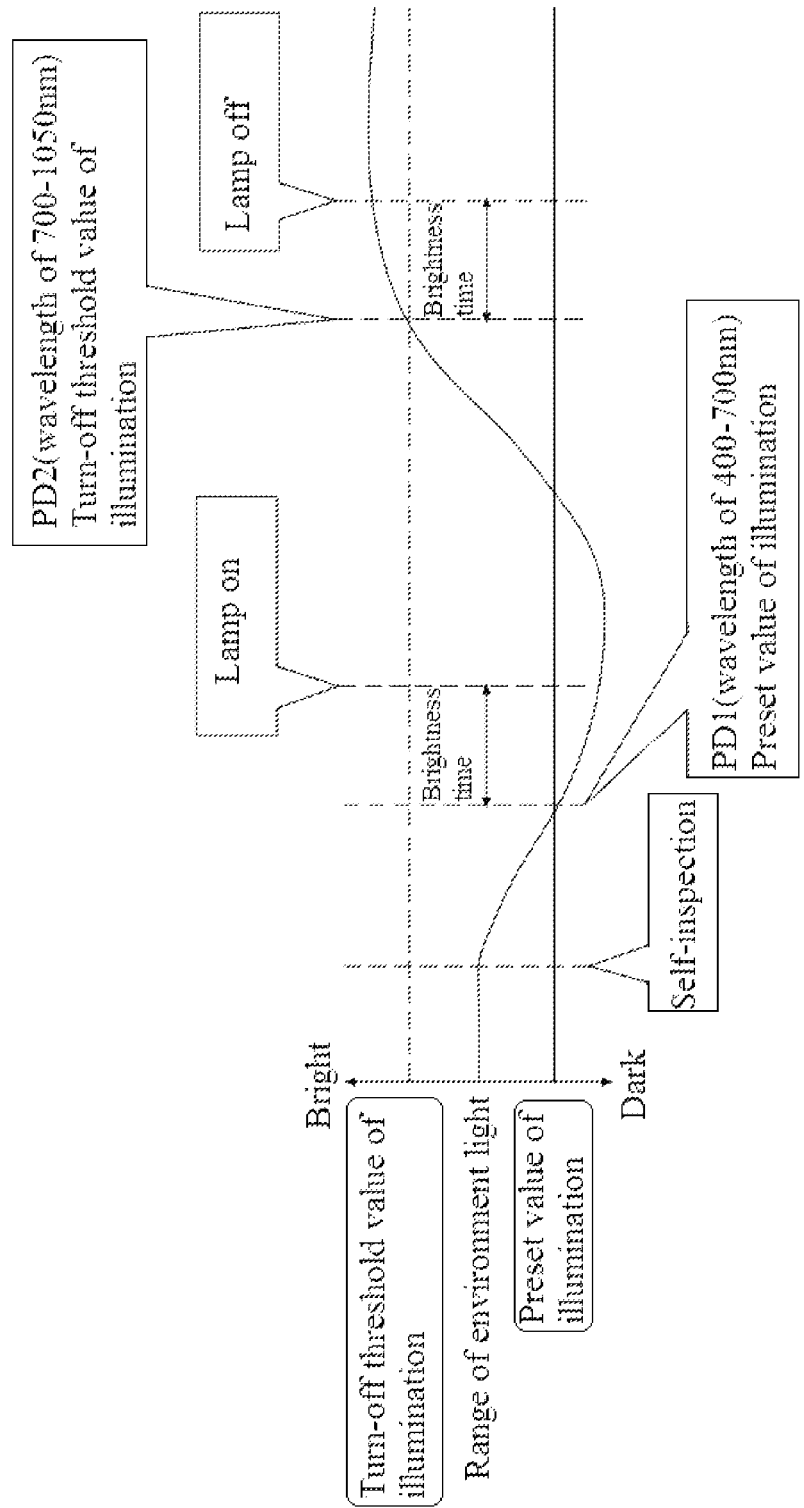
FIG. 6 is an implementation schematic diagram of the built-in sensor for detecting environmental illumination in lamps of the Invention.
Figure 7:
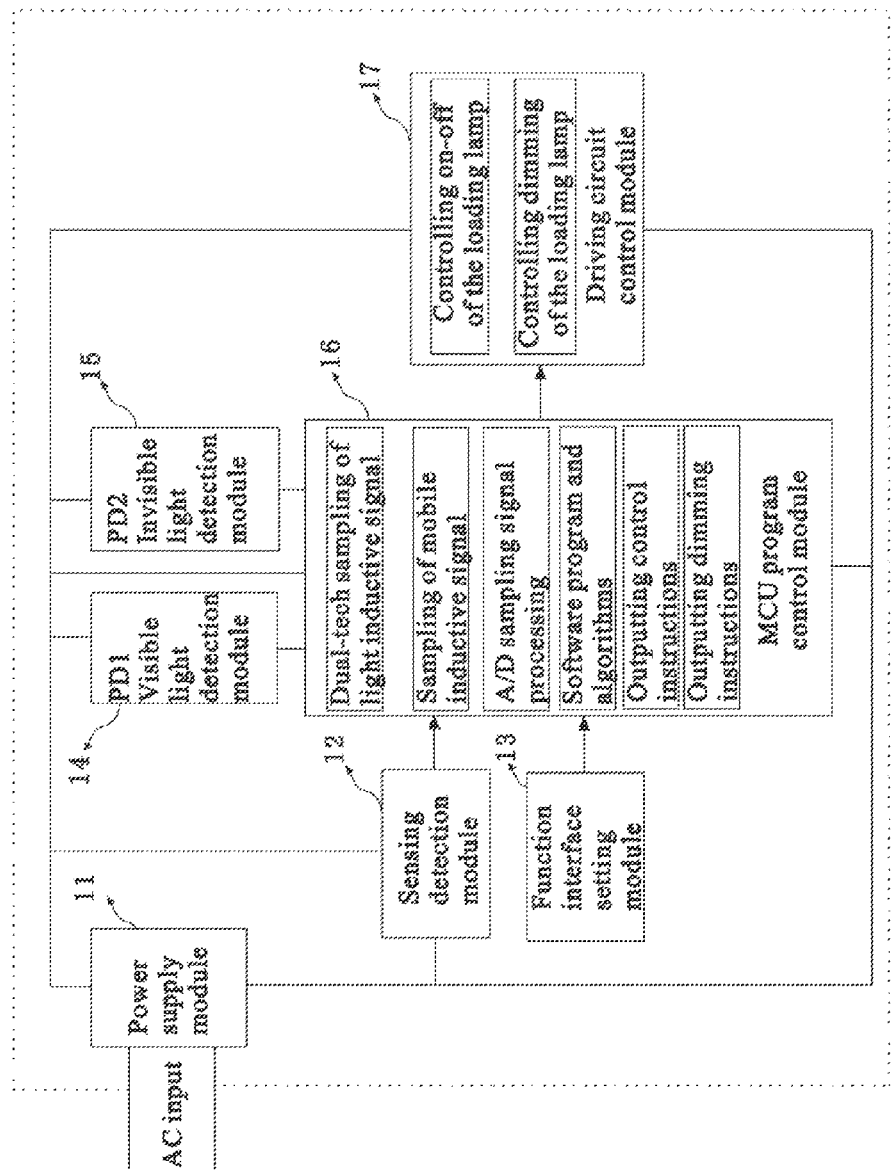
FIG. 7 is a structure diagram of the built-in sensor for detecting environmental illumination in lamps of the Invention.

In order to realize the above method for detecting environmental illumination in lamps, referring to FIGS. 6 and 7, the Invention also provides a built-in sensor for detecting environmental illumination in lamps, which comprises a visible light detection module 14, an invisible light detection module 15, a sensing detection module 12, a function interface setting module 13, an MCU program control module 16 and a driving circuit control module 17; the visible light detection module 14, the invisible light detection module 15, the sensing detection module 12, the function interface setting module 13 and the driving circuit control module 17 are electrically connected to the MCU program control module 16; the visible light detection module 14 is used for obtaining the lux level of visible light in real time; the invisible light detection module 15 is used for obtaining the lux level of invisible light; the sensing detection module 12 is used for obtaining inductive signals of human movements in real time; the function interface setting module 13 is used for inputting and displaying parameters; the MCU program control module 16 is used for calculating and outputting control instructions; the control instruction is sent to the driving circuit control module 17 which is connected to LED lamp sets.

Wherein, the photoelectric sensor in visible light detection module 14 is a photosensitive element with a peak sensitive wavelength $\lambda p$ of 520 nm and a spectral sensitive band of 400-750 nm and the photoelectric sensor in invisible light detection module 15 is a photosensitive element with a peak sensitive wavelength $\lambda p$ of 880 nm and a spectral sensitive band of 700-1050 nm.

Wherein, the photosensitive element is a photodiode, a phototransistor, a silicon photocell, a photoelectric IC or a photoresistor.

Wherein, the sensing detection module 12 comprises but not limited to any of microwave sensor, infrared sensor and sonic sensor.

Wherein, the sensor also comprises a power supply module 11; the power supply module 11 is used for supplying operating load to visible light detection module 14, invisible light detection module 15, sensing detection module 12, function interface setting module 13, MCU program control module 16 and driving circuit control module 17 respectively.

Wherein, the function interface setting module 13 comprises but not limited to a sensitivity setting unit, a preset lux level setting unit, a delay time setting unit, a waiting time setting unit, a remote control interface setting unit and an APP interface setting unit. The MCU program control module 16 comprises a dual-tech sampling unit for light inductive signal, a sampling unit for mobile inductive signal, an A/D sampling signal processing unit, a calculation and analysis unit, control instruction outputting unit, a dimming instruction outputting unit; the control instruction outputting unit outputs on-off signals or FPC/RPC signals to the driving circuit control module; the driving circuit control module controls on-off or dimming of the loading lamp with the switching elements as RELAY, MOSFET, TRIAC and SCR, etc.; the dimming instruction outputting unit outputs 0/1-10V dimming signals, DALI signals, high/low level signals, PWM signals to the driving circuit control module for brightness control of the loading lamp.

The sensing detection module 12 detects the mobile signal of human or object and sends the signals to the sampling unit for mobile inductive signal in MCU program control module 16 for processing. Meanwhile, PD1 visible light detection module 14 samples the environmental lux level "LuxEnvironment" of the visible light when the lamp is turned off and sends the value to the A/D sampling signal processing unit of the MCU program control module 16 for processing; the function interface setting module 13 sets the preset lux level "LuxSetting"; when LuxEnvironment<LuxSetting, the control instruction outputting module of the MCU program control module 16 outputs on-off signals to the driving circuit control module 17 to turn on the lamp to a brightness of T1 and starts timing; PD2 invisible light detection module 15 samples and updates the "environment and lamp" mixed lux level "LuxC" of the invisible light; the software program and algorithm module of the MCU program control module 16 calculates the turn-off threshold value LuxOffT1; if LuxC keeps exceeding the time "LuxTime" of the turn-off threshold value LuxOffT1 (including but not limited to eg. 5 Min), the control instruction outputting module of the MCU program control module 16 outputs on-off signals to the driving circuit control module 17 to turn off the lamp forcibly and enter into standby mode, so as to save the energy. If LuxC does not exceed the time of the turn-off threshold value LuxOffT1 "LuxTime" (including but not limited to eg. 5 Min), when the delay time of T1 is up, the dimming instruction outputting module of the MCU program control module 16 outputs 0/1-10V dimming signals to the driving circuit control module 17 to control the loading lamp entering the brightness of T2 and starts timing; PD2 invisible light detection module 15 samples and updates the "environment and lamp" mixed lux level "LuxB" of the invisible light; if LuxB keeps exceeding the time "LuxTime" of the turn-off threshold value LuxOffT2 (including but not limited to eg. 5 Min), the control instruction outputting module of the MCU program control module 16 outputs on-off signals to the driving circuit control module 17 to turn off the lamp forcibly and enter into standby mode, so as to save the energy.

The above is a detailed description for the embodiments of the Invention in combination with drawings, but the embodiments of the Invention are not limited to it. For a person skilled in the art, various changes and amendments, replacements and deformations made under the premise of not departing from the spirit and essence of the Invention will fall within the protection scope of the Invention.

What is claimed is:

1. A method for detecting environmental illumination in lamps, comprising the following steps:
    S1: obtaining the environmental lux level on visible light band through a visible light detection module and the environmental lux level on invisible light band through an invisible light detection module when the lamp is turned off;
    S2: turning on the light as the environmental lux level of visible light is lower than the preset lux level, obtaining the mixed lux level of the lamplight and the natural light on visible light band through the visible light detection module and the mixed lux level of the lamplight and the natural light on invisible light band through the invisible light detection module;
    S3: calculating the environmental lux level of invisible light of the lamplight according to the environmental lux level and the mixed lux level on invisible light band so as to further calculate the turn-off threshold value for turning off the lamp; when the mixed lux level of invisible light obtained by the invisible light detection module is greater than the turn-off threshold value, the lamp is turned off.

2. The method for detecting environmental illumination in lamps according to claim 1, wherein, in the Step S3, the formula of the turn-off threshold value is as follows:

$$\text{LuxOff}=(\text{Lux}S+\text{Lux}O+\text{Lux}L)*k;$$

wherein, LuxOff is a turn-off threshold value of the lamp; LuxS is a preset lux level; LuxO is a fixed illumination compensation value; LuxL is an lux level of invisible light; k is an adjustment coefficient, which is greater than 1.

3. The method for detecting environmental illumination in lamps according to claim 1, wherein, the visible light detection module is used for detecting the lux level on the visible light band of 400 nm-700 nm; the invisible light detection module is used for detecting the lux level on the invisible light band of 700 nm-1050 nm.

4. The method for detecting environmental illumination in lamps according to claim 1, wherein, in the step S2, the inductive signals of human movements are obtained in real time; meanwhile, the lamp is turned on when the environmental lux level of visible light is lower than the preset lux level.

5. The method for detecting environmental illumination in lamps according to claim 4, wherein, the lamp comprises two operating modes as delay brightness and waiting brightness; the lamp enters the operating mode of delay brightness firstly when it is turned on and enters the operating mode of waiting brightness after a delay time; the turn-off threshold value for the operating mode of delay brightness is calculated corresponding to the operating mode of delay brightness and the turn-off threshold value for the operating mode of waiting brightness is calculated corresponding to the operating mode of waiting brightness.

6. A built-in motion sensor for detecting environmental illumination in lamps, comprising a visible light detection module, an invisible light detection module, a sensing detection module, a function interface setting module, an MCU program control module and a driving circuit control module; the visible light detection module, invisible light detection module, sensing detection module, function interface setting module and driving circuit control module are electrically connected to the MCU program control module; the visible light detection module is used for obtaining the lux level of visible light in real time; the invisible light detection module is used for obtaining the lux level of invisible light; the sensing detection module is used for obtaining inductive signals of human movements in real time; the function interface setting module is used for inputting and displaying parameters; the MCU program control module is used for calculating and outputting control instructions; the control instructions are sent to the driving circuit control module which is connected to LED lamp sets.

7. The built-in motion sensor for detecting environmental illumination in lamps according to claim 6, wherein, a photoelectric sensor in the visible light detection module is a photosensitive element with a peak sensitive wavelength $\lambda p$ of 520 nm and a spectral sensitive band of 400-750 nm and a photoelectric sensor in the invisible light detection module is a photosensitive element with a peak sensitive wavelength $\lambda p$ of 880 nm and a spectral sensitive band of 700-1050 nm.

8. The built-in motion sensor for detecting environmental illumination in lamps according to claim 6, further comprising a power supply module; the power supply module is used for supplying operating load to the visible light detection module, invisible light detection module, sensing detection module, function interface setting module, MCU program control module and driving circuit control module respectively.

9. The built-in motion sensor for detecting environmental illumination in lamps according to claim 7, wherein, the photosensitive element is a photodiode, a phototransistor, a silicon photocell, a photoelectric IC or a photoresistor.

10. The built-in motion sensor for detecting environmental illumination in lamps according to claim 6, wherein, the sensing detection module comprises but not limited to any of microwave sensor, infrared sensor and sonic sensor.

* * * * *